United States Patent

Gaines et al.

[15] 3,641,447

[45] Feb. 8, 1972

[54] PHASE SHIFT DETECTOR

[72] Inventors: Brian R. Gaines, Colchester; Raymond A. Shemer, Harlow, both of England

[73] Assignee: International Standard Electric Corporation, New York, N.Y.

[22] Filed: Feb. 25, 1970

[21] Appl. No.: 14,423

[30] Foreign Application Priority Data

Mar. 19, 1969 Great Britain ........................ 14,389/69

[52] U.S. Cl. ............................ 329/126, 324/79 D, 324/83 Q, 328/134, 329/50, 329/111, 343/114

[51] Int. Cl. ................................................ H03d 3/04

[58] Field of Search .................... 328/134; 329/50, 111, 112, 329/124, 126; 324/79 D, 83 Q

[56] References Cited

UNITED STATES PATENTS

| | | | |
|---|---|---|---|
| 3,538,345 | 11/1970 | Norz | 329/112 X |
| R26,210 | 5/1967 | Russell | 328/134 X |
| 3,121,202 | 2/1964 | Gray | 329/12 X |
| 3,177,347 | 4/1965 | Cowley | 324/83 Q X |

FOREIGN PATENTS OR APPLICATIONS

| | | | |
|---|---|---|---|
| 492,273 | 4/1953 | Canada | 329/112 |

*Primary Examiner*—Alfred L. Brody
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An apparatus for measuring the phase of an input signal utilizing cross-correlation techniques. In a first channel, the input signal is digitally compared with a reference pulse train having a pulse density distribution which approximates a sign wave and is then integrated. In a second channel, the input signal is digitally compared with a pulse train signal whose pulse density distribution approximates a cosine wave and is then integrated. The first and second channel integrators are cross coupled to form a harmonic oscillator. A digital counter provides a measure of the time elapsed before the oscillator signal reaches a zero phase. This measurement is proportional to the phase of the original input signal.

1 Claims, 5 Drawing Figures

Inventors
BRIAN R. GAINES
RAYMOND A. SHEMER
By Philip M Bolton
Attorney

I

II

III

IV

Inventors
BRIAN R. GAINES
RAYMOND A. SHEMER
By Philip M Bolton
Attorney

I

II

III

IV

PHASE SHIFT DETECTOR

BACKGROUND OF THE INVENTION

This invention relates to a phase-shift measuring apparatus of a type in which the phase of an input signal of known frequency can, within a few cycles, be determined with respect to a reference datum and more particularly to phase-shift detectors for use in doppler radio direction finding.

Doppler radio direction finders operate on the differential doppler frequency shift of the signal from an airborne transmitter received at a ground station by two aerials mounted on the ends of a boom which rotates in the horizontal plane about its midpoint. In an alternative form of doppler direction finder there are no moving parts and the effect of the two rotating aerials is synthesized by a switched array of stationary aerials. The signal received by each rotating aerial is modulated by that rotation because it is doppler shifted up in frequency when it has a component of velocity towards the transmitter, and down in frequency when it has a component of velocity away from the transmitter.

Typically the aerials rotate at 3 Hz. in the case of a mechanically rotating boom, and 10 Hz. in the case of a switched array, and the signal from one of these aerials is modulated at 4 kHz. before being fed into the receiver together with the signal from the other aerial. These two signals beat together at the second detector of the receiver yielding an output at the difference frequency of 4 kHz. plus twice the doppler shift. In effect the receiver output appears as a 4 kHz. carrier frequency sinusoidally modulated at the aerial rotation frequency, the modulation having a phase, measured relative to the rotation of the aerials, that depends on the azimuth of the radio transmitter. By measuring this phase the apparatus provides an output indicative of the azimuth of the radio transmitter.

Reflections from buildings and other obstructions near the aerials, or any overloading of the receiver, will result in harmonic distortions of this sinusoidal modulation which must be disregarded by the phase measuring apparatus if such distortion is not to introduce an error into the measurement.

Since the radio signals from the transmitter may only last for a short time, and since it is generally preferred to rotate the aerials as slowly as possible, it is desirable that the phase be capable of being measured within only 1 or 2 cycles. This requirement is virtually impossible to meet with phase measuring systems relying on filters or servo tracking since these invariably require several cycles of signal for the initial transients to decay sufficiently. This invention avoids these problems of transients by employing the principles of cross-correlation to effect the measurement of the phase.

The theory of phase measurement by cross-correlation is that if an input signal represented by the expression $$f_o(t) = A_1 \cos(\omega t + \phi)$$

is multiplied by a locally generated reference signal represented by the expression $$f_1(t) = B_1 \sin \omega t$$

and the resultant is integrated over a single cycle, then the integral is proportional to $\sin \phi$. Similarly, if the same input signal is multiplied by another locally generated reference signal in phase quadrature with the first mentioned reference signal, and represented by the expression $$f_2(t) = B_1 \cos \omega t$$

and the resultant is integrated over a single cycle, then this integral is proportional to $\cos \phi$. The phase of the input signal with respect to the reference signals can then be extracted as $\tan^{-1}$ the ratio of the two integrals. In addition to the advantage of the rapidity with which, in theory, this measurement can be made, there is the advantage that if the input signal is contaminated by harmonics these will have no effect upon the measurement, and if the signal is also contaminated with noise the effect of this noise will be integrated over 1 cycle. While however the theory of this method of measurement is relatively simple and straightforward in mathematical terms, its implementation by machine is not so simple as it involves the evaluation of two products of time varying analogue functions and the evaluation of one ratio and an inverse tan function. The method of implementation disclosed by this invention involves the use of hybrid analogue-digital techniques in which each product is obtained by gating the input signal with a pulse train having a pulse density distribution which synthesizes part of a sinusoidal wave, and in which the extraction of the phase angle is extracted from two integrals by cross coupling the two integrators at which these integrals are formed in such a way as to form an harmonic oscillator, and then observing the time elapsing before the oscillator reaches a predetermined state.

The use of these hybrid techniques means that the input signal is not multiplied with pure sinusoidal wave, but with one having harmonics. If any of the harmonics that appear in this synthesized waveform also appear in the input signal there will be cross-correlation at those harmonic frequencies, and such cross-correlation will give rise to errors in the measurement of phase. Since it is not necessary to eliminate or minimize a particular harmonic component from both the input signal and the synthesized waveform, it is possible to reduce the susceptibility of the apparatus to this form of error to within an acceptable limit by filtering, if necessary, any high harmonic content from the input signal, and by choosing a synthesized waveform with a negligible harmonic content at the lower harmonic frequencies. There are objections to attempting to remove the lower harmonics from the input signal by means of filtering, on account of the effects of transients and the temperature dependence of phase shift introduced by such filters, but the high harmonics such as the seventh and higher harmonics can be removed in this way because these effects will not be significant at the fundamental frequency. At the same time it is possible to construct a relatively simple synthesized waveform having no even harmonic content, and only a negligible amount of the lower odd harmonics.

According to the invention there is provided a phase shift measuring apparatus for determining the phase of a given frequency component of an input signal with respect to a reference signal which comprises a source of clock pulses having a repetition frequency equal to a multiple of the given frequency, a source of a first pulse train signal derived from said clock pulse, a source of a second pulse train signal derived from said clock pulse, means for gating the input signal with each of said first and said second pulse train signals such that the gated outputs represent the products of the input signal with each of said first and second pulse trains having fundamental sinusoidal frequency components which are equal in frequency to the given frequency, and are in phase quadrature with each other and bear a predetermined phase relationship with the reference signal, and means for processing the gated outputs to provide a signal proportional to the phase of the input signal.

The foregoing and other features of the invention will become more apparent and the invention itself will be best understood by reference to the following description of a doppler radio direction finder embodying the invention in a preferred form. The description refers to the accompanying drawings in which.

Figure 1:
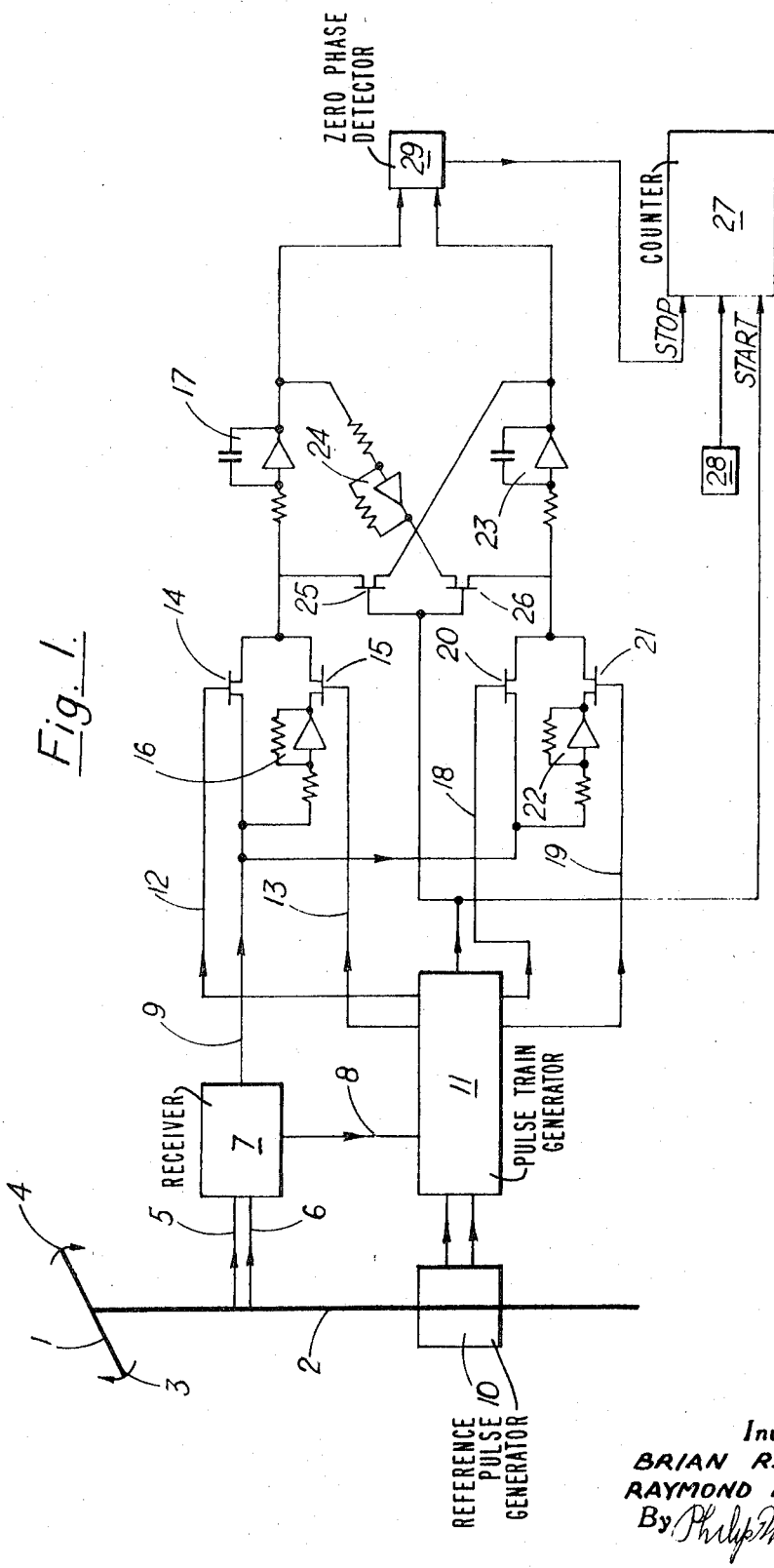
FIG. 1 is a circuit diagram of a doppler radio direction finder.

In the doppler radio direction finder depicted in FIG. 1 a boom 1 is mounted at the end of a rotating shaft 2 and on the ends of the boom are mounted two aerials 3 and 4 which are connected to signal channels 5 and 6 which are fed to a receiver 7. When a radio signal is received by the aerials 3 and 4 the receiver provides a sinusoidal signal output at 9 which forms the input signal to the phase shift detector. At the same time the receiver provides a control signal at 8 indicating that it is currently receiving a radio signal. The frequency of the sinusoidal output is equal to the frequency of rotation of the aerials and its phase relationship with reference to their rotation depends upon the direction from which the radio signal is being received. In order to provide a datum against which the phase of this sinusoidal output can be measured, a datum and reference pulses generator 10 is driven by the rotation of the shaft 2. This provides a datum pulse each time the shaft makes a complete revolution, and on a separate channel a clock pulse each time the shaft makes a sixty-fourth part of a revolution. It is convenient to arrange that the datum pulse occurs when the boom is pointing in a North South direction and that this pulse shall be in synchronism with one of the clock pulses. The datum and clock pulses are fed to a pulse trains generator 11 which also has an input from the receiver 7 over the control signal channel 8. This pulse trains generator 11 consists of a counter together with associated logic circuits, and is designed to produce on receipt of a signal input at 8 two pulse trains whose pulse density distributions synthesize two sinusoidal waveforms in phase quadrature, one of these waveforms being a sine wave in phase with the datum pulses, and the other being a cosine wave.

The pulse train having the density distribution appropriate to cosine is transmitted over two channels 12 and 13 to control two gates 14 and 15 provided by field effect transistors. The pulses synthesizing the positive half of the cycle of the waveform are transmitted over channel 12 and are then repeated over channel 12 so as to form the negative half of the cycle. The sinusoidal output from the receiver 7 is fed direct to the gate 14, but is fed via in inverting stage 16 to the gate 15. The outputs of these two gates are commoned to provide a signal, to be fed to an integrator 17, which is product of a cosine waveform with the input signal appearing at 9.

Similarly the pulse train having the density distribution appropriate to sine is transmitted over two channels 18 and 19 to field effect transistor gates 20 and 21. The sinusoidal output from receiver 7 is connected directly to gate 20, and via an inverting stage 22 to gate 21. The outputs of these gates are commoned to provide a signal to be fed to an integrator 23 which is the product of a sine waveform with the input signal at 9. If the integrators 17 and 23 integrate the gated waveform over 1 complete cycle integrator 17 will have an output proportional to cos $\phi$, and the output of integrator 23 will be proportional to sin $\phi$, where $\phi$ is the phase angle between the input signal and the synthesized waveforms. This proportionality will also exist if the integration is performed over an integral number of cycles, and provided that no DC or harmonics exist in the input, it would also exist if the integration were performed over only half a cycle. To extract a measure of this phase angle $\phi$ the two integrators 17 and 23 are cross coupled, with an inverting stage 24 in one of the coupling links, to form an harmonic oscillator. The cross coupling links are established via gates formed by field effect transistors 25 and 26 which are controlled by the pulse trains generator 11 by control signals which are distinct from the waveform synthesizing pulse trains. The frequency of oscillation of the harmonic oscillator is determined by the resistive and capacitive values of the two integrators and the inverting stage forming the oscillator. The phase angle at which it starts oscillation is determined by the initial conditions of the two integrators, and must be either equal to $\phi$ or to $-\phi$ depending on which cross coupling link includes the inverting stage. This harmonic oscillator is connected up so that the phase angle is $-\phi$, in which case the phase angle $\phi$ is directly proportional to the time taken before the oscillator reaches the state of zero phase. This time, and hence also the phase angle, is measured by the value of the count appearing in a counter 27 which is driven by a local pulse generator 28. The counter is started by the same signal from the pulse trains generator 11 that establish the cross coupling links via gates 25 and 26, and is stopped by a signal from a zero phase detector 29 which is adapted to produce a signal when the output of integrator 23 first falls to zero while the output of integrator 24 is positive.

Incorporated in the receiver 7 is a low-pass filter which eliminates seventh harmonic and above from the input signal. Hence the synthesized waveforms produced by the pulse generator 11 is designed to have the lower harmonics minimized. By making the synthesis of the negative half of a cycle the image of the positive half the even harmonics are inherently eliminated from the synthesized waveforms produced by the pulse trains generator 11. Therefore it is only necessary to choose a pulse density distribution in which the third and fifth harmonics are deliberately minimized. A pulse density distribution based on 64 pulses to the cycle which synthesizes a sinusoidal wave with 0.0242 percent third harmonic and −0.2839 fifth harmonic will now be described with reference to FIG. 2.

Figure 2:
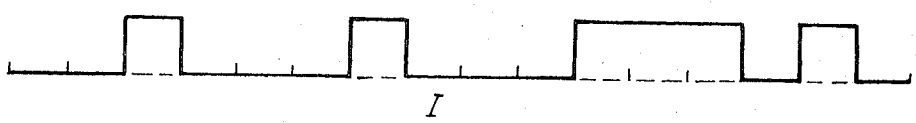
FIG. 2 is a representation of a pulse train having a sinusoidal pulse train having a sinusoidal pulse density distribution.
Figure 2:
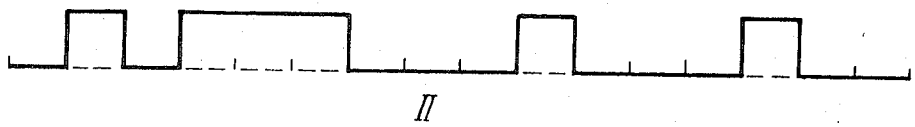
Figure 2:
Figure 2:
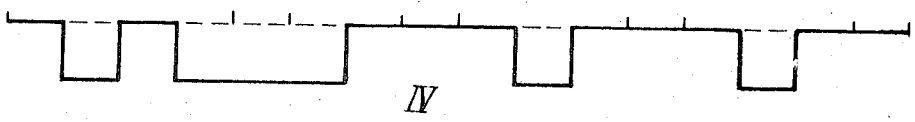

FIG. 2 shows the part of the pulse train which synthesizes the first two quadrants of the sine wave. Since these quadrants are both positive, the pulses are used to turn on gate 20 so as to transmit to the integrator portions of the direct signal from the receiver. The integrator is seen therefore to integrate the product of the input signal with the positive half of a synthesized sine wave. Since the first two quadrants are synthesized using 32 time slots, the next 32 time slots are employed to synthesize the remaining quadrants. For this purpose the pulse train is repeated, but since it is synthesizing the negative portion of a sine wave and is employed to form a product of this wave with the input signal, the pulse train is now used to turn on gate 21 so as to transmit to the integrator the inverse of the signal from the receiver.

The same gating principles are applied to gates 14 and 15 to form an output equivalent to the multiplication of the input signal from the receiver with a synthesized cosine wave. The part of the pulse train synthesizing the first quadrant of the cosine wave is identical with that synthesizing the second quadrant of the sine wave, and since this quadrant of the cosine wave is positive, it is applied to gate 14 so as to gate the direct input signal, whereas the part synthesizing the second quadrant, being equivalent to the third quadrant of the sine wave, and negative, is applied to gate 15 so as to gate the inverse of the input signal. Similarly the third and fourth quadrants of the cosine wave correspond respectively to the fourth and first quadrants of the sine wave and are therefore applied to the gates in an analogous manner.

Figure 3:
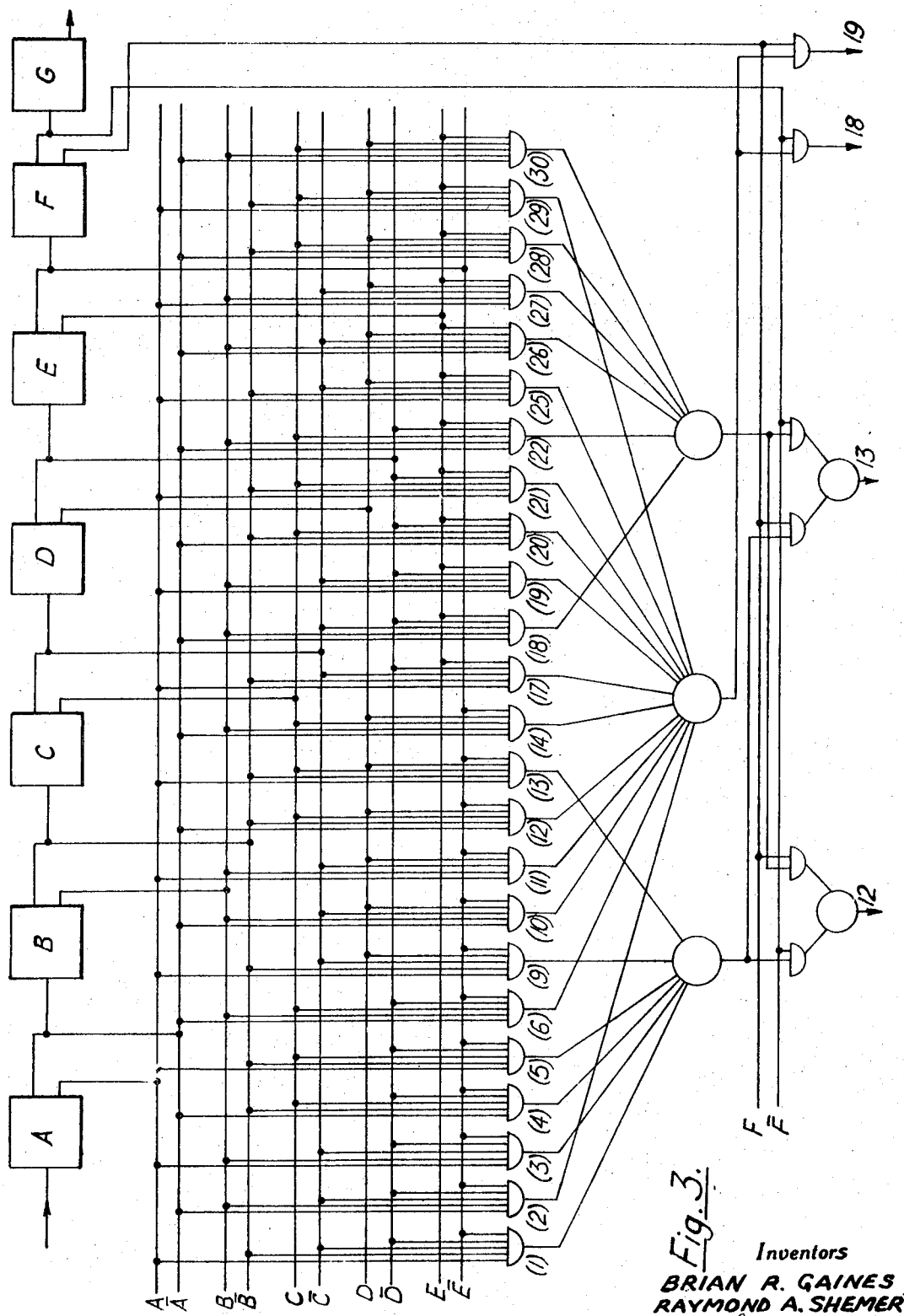
FIG. 3 is a circuit diagram of that part of the doppler radio direction finder of FIG. 1 which generates pulse trains of the form illustrated in FIG. 2.

FIG. 3 shows in greater detail the preferred form of pulse trains generator which consists of a circuit employing a seven-bit counter to generate the synthesized sine and cosine waveforms described above. Considering first the synthesis of the sine wave the connection of the first five stages of the counter is such that an output will occur at 18 in time slots 2, 6, 10, 11, 12, 14, 17, 19, 20, 21, 25, and 29 so as to produce the positive half of the waveform. For the next 32 time-slots the output of the sixth stage of the counter, stage F, is reversed, and so the pattern first appearing at output 18 is repeated at output 19 to provide the negative half of the cycle. Considering now the synthesis of the cosine wave, the first quadrant, which is positive, is synthesized by an output at 12 in time slots 1, 3, 4, 5, 9 and 13, and the second quadrant, which is negative, is synthesized by an output at 13 in time slots 18, 22, 26, 27, 28 and 30. The third and fourth quadrants are repeats of the first and second quadrants with the sign changed so that the third quadrant is produced at 13 and the fourth at 12.

At the completion of 1 cycle the seventh stage of the counter, stage G, is set to provide an output which performs three functions: it terminates the integration of integrators 17 and 23, it is applied to gates 25 and 26 to establish the cross coupling connections of the harmonic oscillator, and it is also applied to the counter 27 to start it counting.

In the interests of clarity detail has been omitted from FIGS. 1 and 3 which relates to the clearing of the counters and integrators, and also that relating to the means by which the apparatus is held in a state ready to make an evaluation of phase angle. After each evaluation the counters are cleared and the outputs of integrators 17 and 23 are short circuited to their inputs. Then, when a signal is detected by the receiver 7, it provides over the control signal channel 8 a signal, for the pulse trains generator 11, which when followed by a datum pulse, connects the counter of the pulse trains generator to the clock pulses from the datum and clock pulses generator 10, and also disconnects the short circuits from across the integrators 17 and 23.

In the above description FIG. 2 has shown the pulse trains generator as it would be constructed for measurement employing integration over 1 cycle. It is a simple matter however to modify the circuit so that the apparatus is adapted to integrate over longer or shorter periods of time. In some circumstances it may be desirable to integrate over a number of cycles, as, although the error attributable to harmonic content will not be reduced thereby, the error attributable to noise will be reduced, since it is integrated over a longer period. In other circumstances, particularly when the fundamental frequency is very low, it may be desirable to obtain a reading before even 1 cycle has been completed, in which case a coarse reading can be obtained by terminating the integration after half a cycle. A coarse reading of this type might be followed by a repeat integration performed over a longer period to provide a subsequent fine reading.

Figure 4:
FIG. 4 represents an alternative pulse train.
Figure 4:
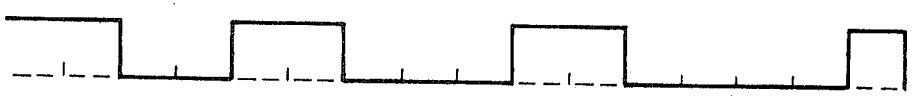
Figure 4:
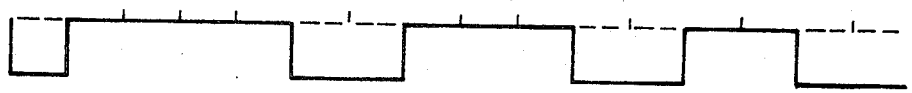
Figure 4:
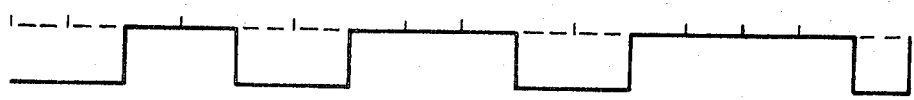
Figure 5:
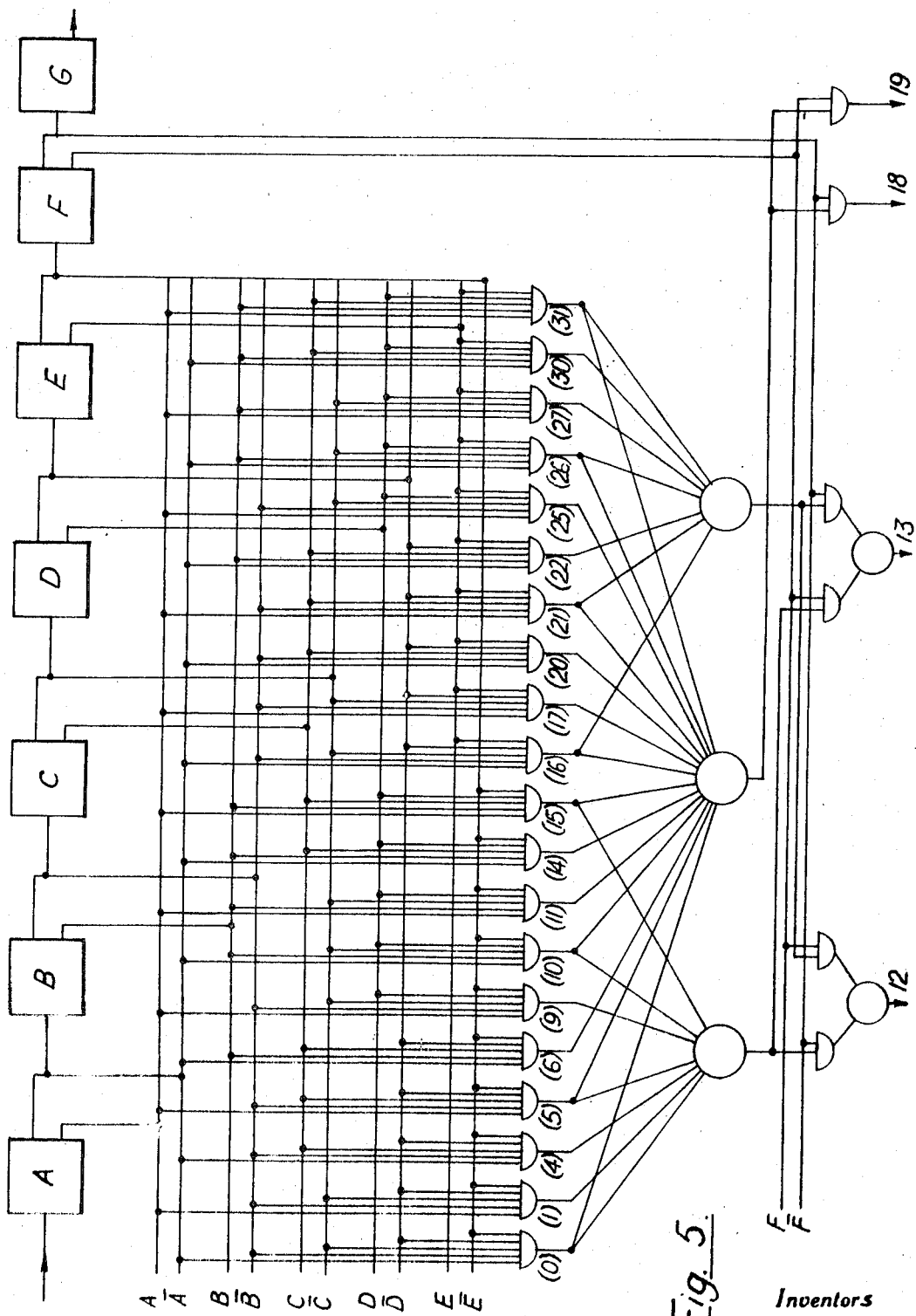
FIG. 5 shows the modifications to the circuit of FIG. 3 required for the generation of the alternative pulse trains of FIG. 4.

In the design of a synthesized waveform pulse train to suit specific requirements a compromise is generally required between the number of pulses and spaces employed to synthesize a complete cycle, and the suppression of particular harmonics. By way of example the preferred embodiment employs a pulse train described with reference to FIG. 2 in which both third and fifth harmonics have been minimized. Better suppression of the third harmonic can be achieved by using the pulse train illustrated in FIG. 4, however this is only achieved at the expense of a greater fifth harmonic content. Thus while the pulse train of FIG. 4 has a third harmonic content of only −0.0001 percent its fifth harmonic content is 16.80 percent. This pulse train can be used in place of that of FIG. 2 by the use of the circuit illustrated in FIG. 5 in place of that of FIG. 3. In this case not only seventh harmonics and above will have to be eliminated from the input signal to the phase shift detector but also any third harmonic content.

I claim:

1. A phase shift measuring apparatus for determining the phase of a given frequency component of an input signal with respect to a reference signal which comprises:
   a source of clock pulses having a repetition frequency signal to a multiple of the given frequency;
   means for deriving a first pulse train signal from said clock pulse;
   means for deriving a second pulse train signal from said clock pulse;
   means for gating the input with each of said first and second pulse train signals such that the gated outputs represent the products of the input signal with each of said first and second pulse trains having fundamental sinusoidal frequency components which are equal in frequency to the given frequency, and are in phase quadrature with each other and bear a predetermined phase relationship with the reference signal;
   a first integrator;
   a second integrator;
   means for coupling said gated outputs to said first and second integrators respectively for a predetermined period of time;
   means for cross coupling the inputs and outputs of said first and second integrators to form a harmonic oscillator;
   a local pulse generator;
   a phase detector coupled to the outputs of said first and second integrators; and
   a counter driven by said local pulse generator and coupled to the output of said zero phase detector for measuring phase shift by counting elapsed time before the oscillator signal reaches zero phase.

* * * * *